United States Patent
Henderson et al.

(10) Patent No.: US 10,749,889 B2
(45) Date of Patent: Aug. 18, 2020

(54) RULE-BASED REMEDIATION OF VULNERABILITIES IN A MANAGED NETWORK

(71) Applicant: ServiceNow, Inc., Santa Clara, CA (US)

(72) Inventors: Lisa Sherilyn Henderson, Temecula, CA (US); Eun-Sook Arlene Watson, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 283 days.

(21) Appl. No.: 15/972,404

(22) Filed: May 7, 2018

(65) Prior Publication Data

US 2019/0342323 A1 Nov. 7, 2019

(51) Int. Cl.
*H04L 29/06* (2006.01)
*G06F 16/245* (2019.01)
*G06F 16/28* (2019.01)

(52) U.S. Cl.
CPC ........ *H04L 63/1433* (2013.01); *G06F 16/245* (2019.01); *G06F 16/285* (2019.01); *H04L 63/20* (2013.01)

(58) Field of Classification Search
CPC ... H04L 63/1433; H04L 63/20; G06F 16/245; G06F 16/285
USPC .......................................................... 726/1
See application file for complete search history.

(56) References Cited

U.S. PATENT DOCUMENTS

| | | | | |
|---|---|---|---|---|
| 7,308,712 B2 * | 12/2007 | Banzhof | ............... | G06F 21/577 726/22 |
| 8,789,192 B2 * | 7/2014 | LaBumbard | .......... | G06F 21/577 726/25 |
| 9,253,202 B2 | 2/2016 | Thakur | | |
| 2005/0005171 A1 * | 1/2005 | Oliphant | ................. | G06F 21/50 726/4 |
| 2007/0266138 A1 * | 11/2007 | Spire | .................... | G06F 11/0709 709/223 |
| 2010/0192228 A1 | 7/2010 | Levi | | |
| 2013/0227695 A1 * | 8/2013 | Shankar | ................ | G06F 21/577 726/25 |

OTHER PUBLICATIONS

"ServiceNow Documentation" downloaded on Apr. 11, 2018 from docs.servicenow.com.

* cited by examiner

*Primary Examiner* — Michael S McNally
(74) *Attorney, Agent, or Firm* — Fletcher Yoder PC

(57) ABSTRACT

A computing system may include a database disposed within a computational instance of a remote network management platform that manages a managed network. Additionally, the computing system may include server device(s) disposed within the computational instance. The server device(s) may be configured to: compare, in order of priorities of assignment rules, a particular configuration item to the assignment rules until a matching condition is found, where the comparison includes consideration of one or more of: (i) particular item attributes of the particular configuration item or (ii) particular vulnerability attributes that apply to the particular configuration item; determine a particular remediator identifier related to the matching condition; based on a key and the particular remediator identifier, determine a particular group for the particular configuration item according to grouping rules; and store, in the database, a reference to the particular configuration item in the particular group.

20 Claims, 10 Drawing Sheets

KEY 608

| ATTRIBUTES |
| --- |
| SECURITY VULNERABILITY |
| LOCATION |
| DEPARTMENT |

ASSIGNMENT RULES 610

| PRIORITY | CONFIGURATION-ITEM CONDITION | REMEDIATOR IDENTIFIER |
| --- | --- | --- |
| 1 | SECURITY VULNERABILITY: PHISHING ATTACK | EMAIL MANAGEMENT GROUP |
| 2 | USER TYPE : C LEVEL (CEO, CFO, ETC.) | C LEVEL IT GROUP |
| 3 | HARDWARE CHARACTERISTIC: CONFIGURATION ITEM IS A DATABASE WITH PERSONALLY IDENTIFIABLE INFORMATION (PII) DATA | PII DATABASE GROUP |
| 4 | OPERATING SYSTEM TYPE: WINDOWS OPERATING SYSTEM<br>SECURITY VULNERABILITY: NETWORK ATTACK<br>TYPE OF NETWORK: LOCAL | WINDOWS NETWORKING GROUP |

GROUPING RULES 612

| GROUP | ATTRIBUTES | REMEDIATOR IDENTIFIER |
| --- | --- | --- |
| G1 | SECURITY VULNERABILITY: PHISHING ATTACK<br>LOCATION: SAN DIEGO<br>DEPARTMENT: MARKETING | EMAIL MANAGEMENT GROUP |
| G2 | SECURITY VULNERABILITY: PHISHING ATTACK<br>LOCATION: NEW YORK<br>DEPARTMENT: MARKETING | EMAIL MANAGEMENT GROUP |
| G3 | SECURITY VULNERABILITY: NETWORK ATTACK<br>LOCATION: NEW YORK<br>DEPARTMENT: MARKETING | C LEVEL IT GROUP |
| G4 | SECURITY VULNERABILITY: NETWORK ATTACK<br>LOCATION: CHICAGO<br>DEPARTMENT: SALES | C LEVEL IT GROUP |
| G5 | SECURITY VULNERABILITY: NETWORK ATTACK<br>LOCATION: CHICAGO<br>DEPARTMENT: SALES | PII DATABASE GROUP |
| G6 | SECURITY VULNERABILITY: NETWORK ATTACK<br>LOCATION: CHICAGO<br>DEPARTMENT: SALES | WINDOWS NETWORKING GROUP |

FIG. 6B

RULE-BASED REMEDIATION OF VULNERABILITIES IN A MANAGED NETWORK

BACKGROUND

Generally, management of an enterprise's network may involve discovering problems with devices of the network and subsequently working to resolve the discovered problems. For example, the enterprise could determine that some devices have or are susceptible to security vulnerabilities, such as due to software defects, weak passwords, and/or phishing attempts, among others. In such situations, the enterprise may seek to identify appropriate remediator(s), such as certain information technology (IT) support group(s), which could help resolve the security vulnerabilities.

SUMMARY

In practice, an enterprise may rely on a remote network management platform to assist with management the enterprise's network. For example, the remote network management platform could discover security vulnerabilities of the managed network's computing devices, servers, and/or other assets. These assets may be referred to herein as "configuration items". Also, discussion of a configuration item having a given security vulnerability could be considered a reference to the given security vulnerability on the configuration item, and vice versa, and either phrase could also be referred herein to as a "vulnerable item" and/or a "vulnerable configuration item", among others. Regardless of the terminology being used, in accordance with the enterprise's set preferences, the remote network management platform could group vulnerable configuration items based on a key, such as by grouping configuration items that have been discovered to have the same security vulnerability and are in the same department of the enterprise, for example.

Overall, grouping of vulnerable configuration items may be advantageous for various reasons. For example, if the remote network management platform groups a set of configuration items based on these configuration items having the same security vulnerability and being in the same department, a remediator at the enterprise could then focus on remediating that security vulnerability for configuration items of the set all at once. In this way, rather than inefficiently remediating security vulnerabilities of configuration items one by one and/or in no particular order, the enterprise could save time on remediation of security vulnerabilities and/or could prioritize remediation for certain vulnerabilities and/or departments of the enterprise, among other advantages.

Although automatic grouping of vulnerable configuration items can be advantageous, factors used by an enterprise as basis for such grouping may be different from those that the enterprise uses as basis for determining appropriate remediator(s) to resolve security vulnerabilities. For example, the enterprise may group configuration items based on security vulnerability and department, in line with the example above. Yet, the enterprise may assign configuration items to its IT support groups for remediation on a per operating system basis, such that, when a particular configuration item having a particular operating system has a security vulnerability or other problem, a particular IT support group dedicated to that particular operating system would handle remediation of that particular configuration item, and so on.

In accordance with the present disclosure, a computing system of a remote network management platform may carry out automatic grouping and assignment of vulnerable configuration items of an enterprise's managed network. The computing system may include a database that stores information about configuration items of the managed network and/or information about security vulnerabilities with respect to the configuration items. Additionally, the database may contain a key, assignment rules, and/or grouping rules, at least some of which may be set in accordance with preferences of the managed network's enterprise (e.g., set via a graphical user interface (GUI) of a client device in communication with the computing system). Such information in the database may be used by the computing system as basis for automatic grouping and assignment of vulnerable configuration items.

As an initial matter, the key may be for defining groups of vulnerable configuration items. As noted, such a key may incorporate certain attribute(s), in accordance with an enterprise's preferences. For example, in line with the examples above, the key may indicate that configuration items should be grouped based on security vulnerabilities and departments. Other examples are also possible.

Additionally, the assignment rules may be in an order of priorities and may set condition(s) for assigning vulnerable configuration items to remediators. More specifically, each remediator may be represented by a remediator identifier in the database. Further, each condition may be an expression referring to one or more attributes. These attributes may include attributes of configuration item, such as an operating system type for example, and/or attributes related to security vulnerabilities, such as a security vulnerability type for example. As such, the assignment rules may respectively relate (i) configuration items with attributes matching conditions to (ii) remediator identifiers.

With this arrangement, the computing system may compare a particular configuration item to the assignment rules until a matching condition is found. In practice, this comparison may be carried out in the order of the priorities of the assignment rules, and may involve consideration of item and/or security vulnerability attributes that apply to the particular configuration item. For example, the highest priority assignment rule may define a condition of "WINDOWS® operating system", and thus the computing system may first determine whether this condition is matched by determining whether the particular configuration item has a WINDOWS® operating system.

Once the computing system finds a matching condition, the computing system may determine a particular remediator identifier related to the matching condition according to the assignment rules. For example, the above-mentioned highest priority assignment rule may relate the condition of "WINDOWS® operating system" to a particular remediator identifier, which represents an IT support group dedicated to resolving issues with configuration items having a WINDOWS® operating system. Thus, if the computing system determines that the particular configuration item has a WINDOWS® operating system, the computing system may determine that the condition of the highest priority assignment rule is matched, and may determine that the particular remediator identifier represents the remediator to which the particular configuration item should be assigned.

Furthermore, the computing system may use the key and the determined particular remediator identifier to determine a particular group for the particular configuration item according to the grouping rule(s). Each grouping rule may specify grouping of vulnerable configuration items that have common values with respect to attributes incorporated by the key and that relate to a common remediator identifier. For example, a particular grouping rule may specify that vulnerable configuration items that have a particular type of security vulnerability, are in a particular department of the enterprise, and have been assigned a particular remediator identifier should be grouped together. Thus, if the particular configuration item meets the criteria set forth by the particular grouping rule, then the computing system may determine that the particular configuration item should be part of a particular group that has been established or is to be dynamically established in accordance with these criteria.

Accordingly, the computing system may store, in the database, a reference to the particular configuration item in the particular group, which may be advantageous for various reasons. In particular, this reference may indicate, to the enterprise, the remediator that should resolve the security vulnerability of the particular configuration item, which amounts to a time-saving and automatic assignment of a remediator in accordance with the enterprise's preferences. Moreover, the assigned remediator may use this reference to determine that the particular configuration item is grouped with other configuration items that have also been assigned to that remediator and that have the same attributes (e.g., same security vulnerability and department) as the particular configuration item. As a result, rather than inefficiently remediating security vulnerabilities in no particular order, the assigned remediator could efficiently remediate a group of configuration items at a time, such as, for example, by simultaneously resolving a particular security vulnerability for all configuration items of a particular department that have been determined to have that particular security vulnerability. Other advantages are also possible.

Accordingly, a first example embodiment may involve a computing system including a database disposed within a computational instance of a remote network management platform that manages a managed network, where the database contains attributes including: item attributes of a plurality of configuration items associated with the managed network, and vulnerability attributes of a plurality of security vulnerabilities related to the item attributes, where the database also contains assignment rules defined by respective priorities and conditions, where the priorities indicate an ordering of the assignment rules, wherein each condition is an expression referring to at least one attribute, where the assignment rules respectively relate, according to the priorities, (i) configuration items with attributes matching the conditions to (ii) remediator identifiers, where the database also contains a key for defining groups of vulnerable configuration items according to a set of grouping rules, where the key incorporates one or more of the attributes.

Further, the first example embodiment may involve the computing system including one or more server devices, disposed within the computational instance, configured to: compare, in order of the priorities, a particular configuration item to the assignment rules until a matching condition is found, wherein the comparison includes consideration of one or more of: (i) particular item attributes of the particular configuration item or (ii) particular vulnerability attributes that apply to the particular configuration item; determine a particular remediator identifier related to the matching condition; based on the key and the particular remediator identifier, determine a particular group for the particular configuration item according to the grouping rules; and store, in the database, a reference to the particular configuration item in the particular group.

A second example embodiment may involve comparing, by a computing system that includes a database disposed within a computational instance of a remote network management platform that manages a managed network, a particular configuration item to assignment rules until a matching condition is found, where the database contains attributes including: item attributes of a plurality of configuration items associated with the managed network, and vulnerability attributes of a plurality of security vulnerabilities related to the item attributes, where the database also contains the assignment rules, where the assignment rules are defined by respective priorities and conditions, where the priorities indicate an ordering of the assignment rules, where each condition is an expression referring to at least one attribute, where the assignment rules respectively relate, according to the priorities, (i) configuration items with attributes matching the conditions to (ii) remediator identifiers, wherein the database also contains a key for defining groups of vulnerable configuration items according to a set of grouping rules, where the key incorporates one or more of the attributes, and wherein the comparison is in order of the priorities and includes consideration of one or more of: (i) particular item attributes of the particular configuration item or (ii) particular vulnerability attributes that apply to the particular configuration item.

The second example embodiment may also involve determining, by the computing system, a particular remediator identifier related to the matching condition. The second example embodiment may additionally involve, based on the key and the particular remediator identifier, determining, by the computing system, a particular group for the particular configuration item according to the grouping rules. The second example embodiment may further involve storing, by the computing system in the database, a reference to the particular configuration item in the particular group.

In a third example embodiment, an article of manufacture may include a non-transitory computer-readable medium, having stored thereon program instructions that, upon execution by a computing system, cause the computing system to perform operations in accordance with the first and/or second example embodiments.

In a fourth example embodiment, a computing system may include at least one processor, as well as memory and program instructions. The program instructions may be stored in the memory, and upon execution by the at least one processor, cause the computing system to perform operations in accordance with the first and/or second example embodiments.

In a fifth example embodiment, a system may include various means for carrying out each of the operations of the first and/or second example embodiments.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6B depicts a key, assignment rules, and grouping rules, in accordance with example embodiments.

DETAILED DESCRIPTION

Figure 1:
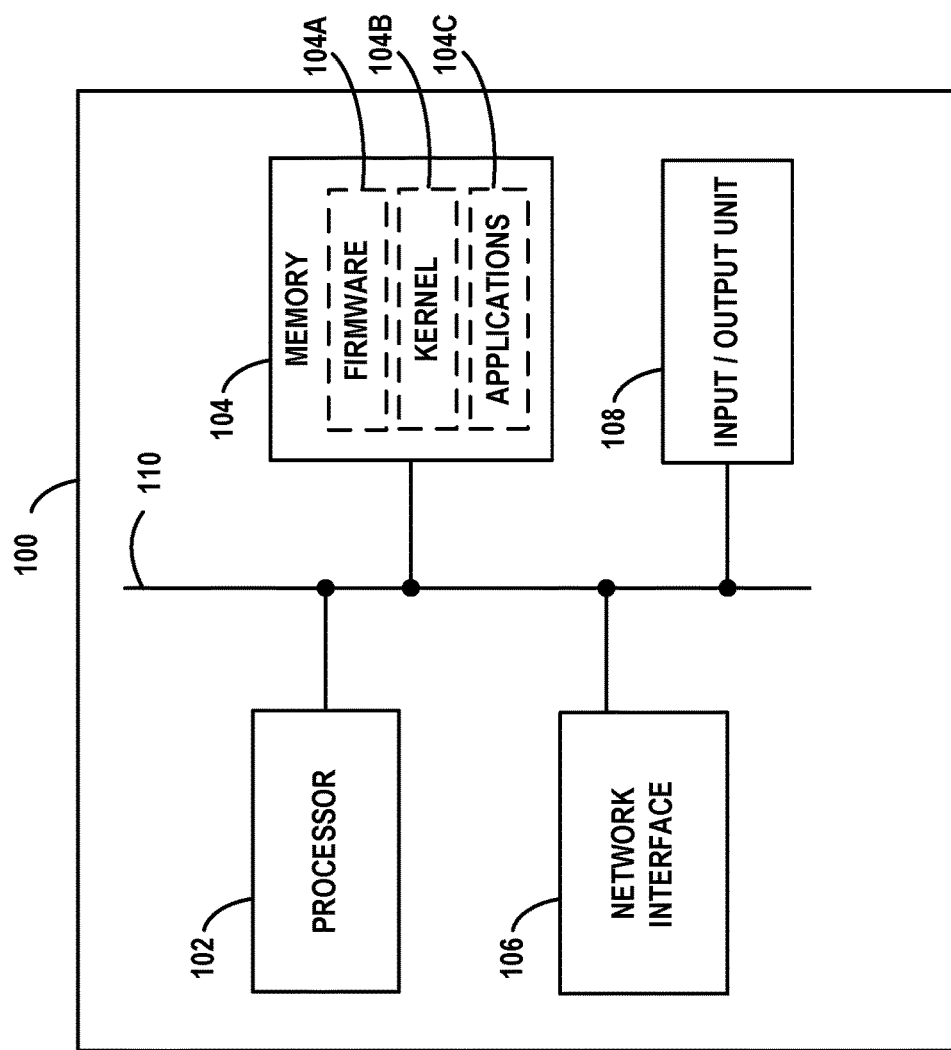
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
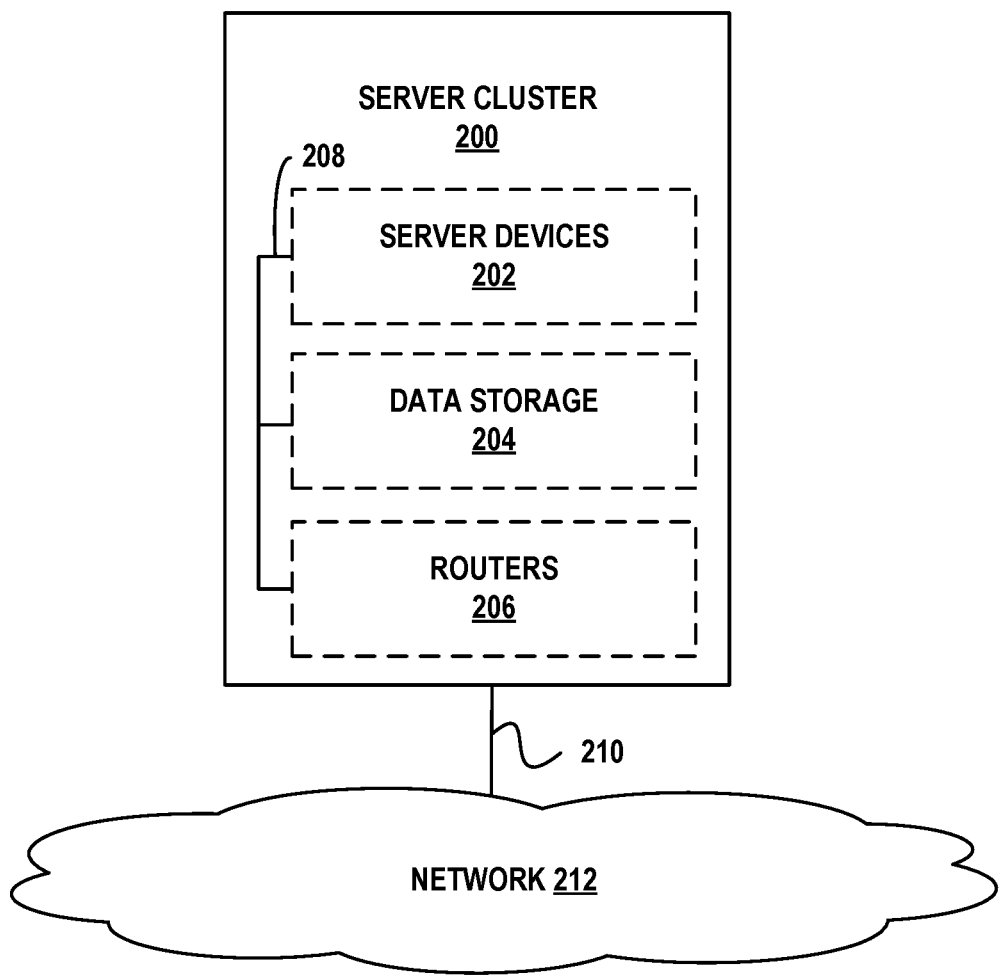
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
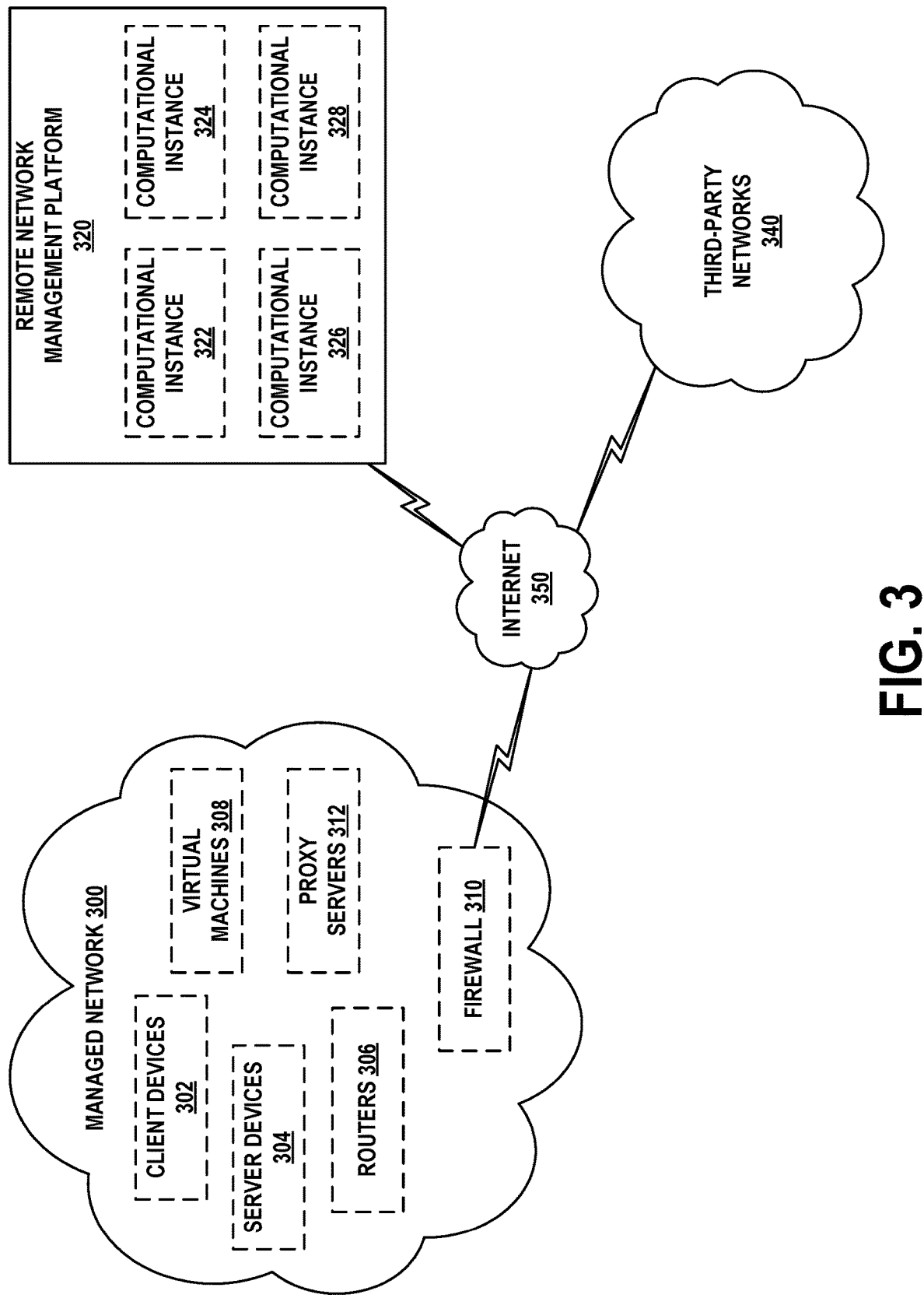
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
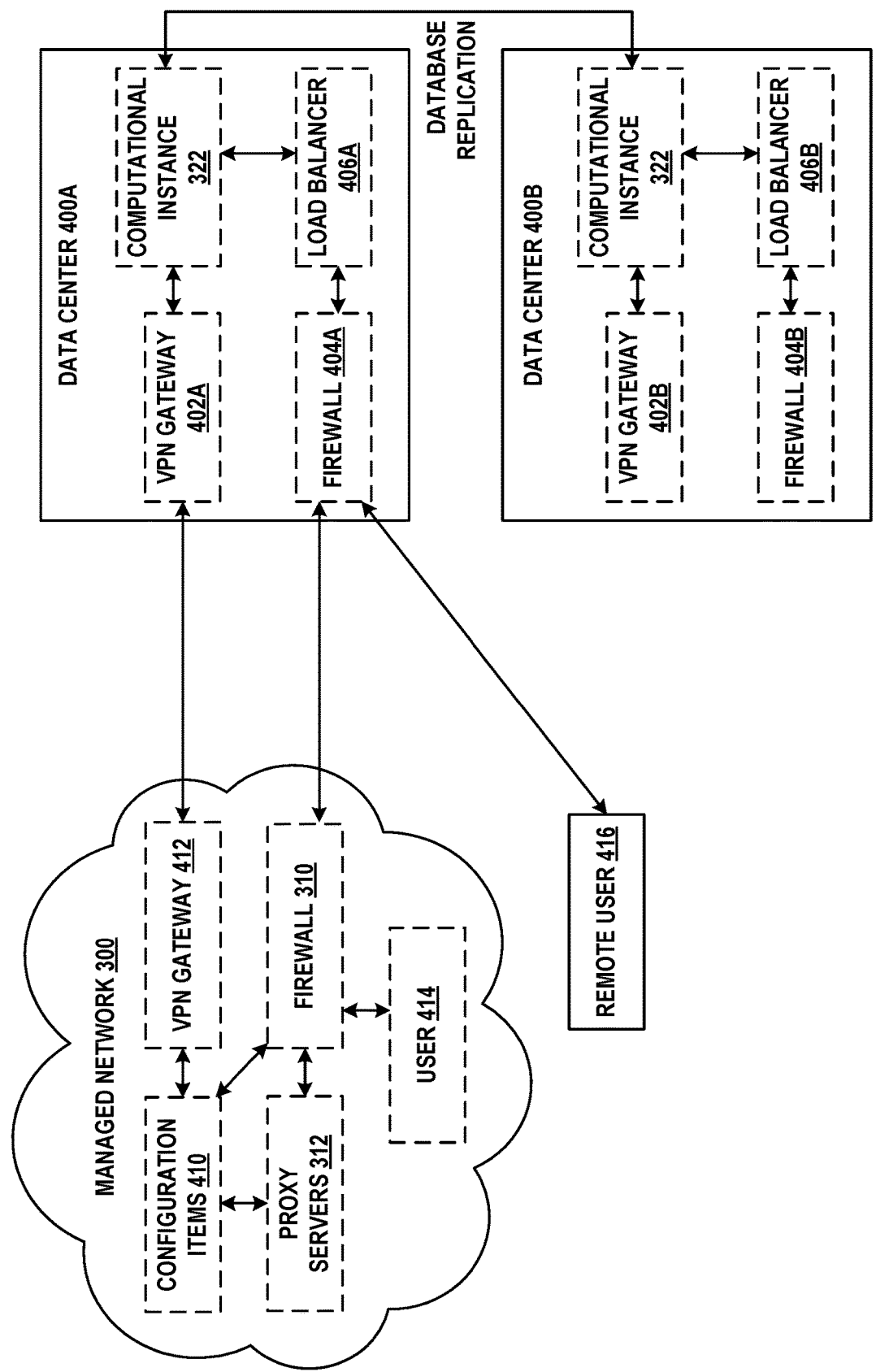
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
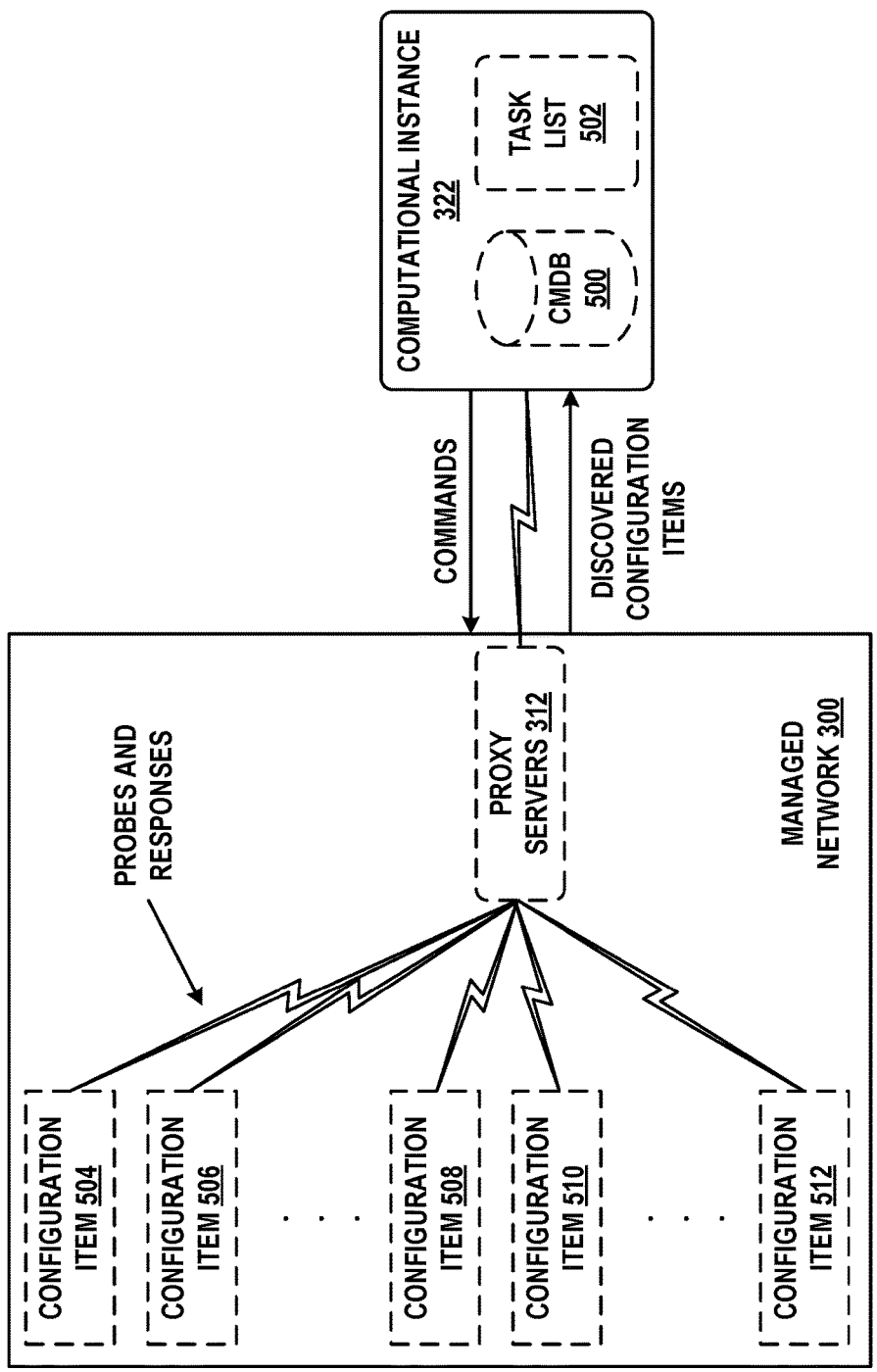
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
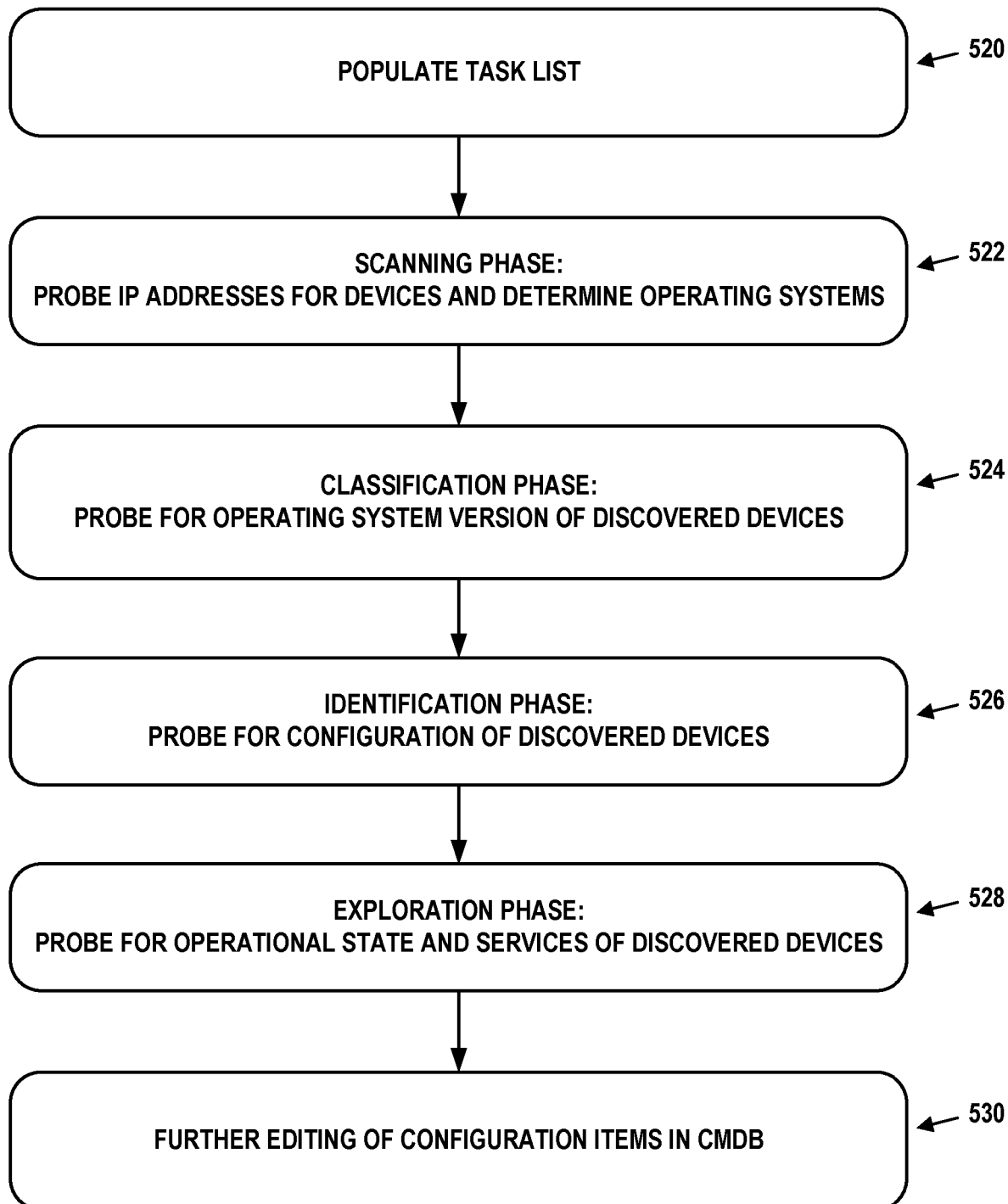
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on.

If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Rule-Based Remediation of Vulnerabilities in a Managed Network

In practice, configuration items of a managed network may have various security vulnerabilities, which may relate to vulnerabilities of hardware, software, network operations, and/or sensitive information, among others. Such vulnerabilities may enable unauthorized action(s) to be performed within the managed network and/or may make configuration items susceptible to damage, among other possibilities.

In some cases, security vulnerabilities may be hardware-related, such as when outdated hardware components make configuration items susceptible to damage (e.g., device damage due to humidity or dust), for example. In other cases, security vulnerabilities may be software-related, such as when outdated software application(s) with various design flaws make configuration item(s) susceptible to hacking or phishing, for example. In yet other cases, security vulnerabilities may be network-related, such as due to the managed network having unprotected communication line(s) and/or unsecure network architecture, for example. Other security vulnerabilities, such as use of weak passwords for example, are also possible.

Generally, a computational instance of a remote network management platform may be configured to discover such security vulnerabilities on a managed network. For example, remote network management platform 320 may have stored thereon vulnerability information about various possible security vulnerabilities. In some cases, information about certain security vulnerabilities may be provided to the remote network management platform 320 through input on a client device associated with the managed network 300 (e.g., by a network administrator). In other cases, information about certain security vulnerabilities may be received by the remote network management platform 320 from third-party server(s), such as from a National Vulnerability Database (NVD). In any case, computational instance 322 could compare attributes of the managed network 300's configuration items (e.g., as specified in the CMDB 500) to the vulnerability information, so as to determine whether one or more of the configurations items have one or more security vulnerabilities. If the computational instance 322 determines that a particular configuration item has a particular security vulnerability according to the comparison, then the computational instance 322 may store (e.g., in the CMDB) vulnerability attribute(s) of the particular security vulnerability in relation to the particular configuration item. Other cases are also possible.

In a specific example, the computational instance 322 may determine that a particular configuration item has installed thereon a particular version of an e-mail software application, and may determine, based on the vulnerability information, that this particular version has a particular security vulnerability related to susceptibility to e-mail phishing attempts. Thus, the computational instance 322 may store vulnerability attribute(s) indicating that the particular configuration item has this particular security vulnerability and indicating information about this particular security vulnerability, such as a security vulnerability type (e.g., phishing) and/or a security vulnerability category (e.g., software-related), among others.

Accordingly, a configuration item may have one or more security vulnerabilities. Herein, discussion of a configuration item having a given security vulnerability could be considered a reference to the given security vulnerability on the configuration item, and vice versa. In either case, a given security vulnerability on a configuration item could be also referred to as a "vulnerable item" and/or a "vulnerable configuration item". Thus, any discussion herein related to grouping and/or assignment of a configuration item having a security vulnerability could be interpreted as grouping and/or assignment of a vulnerable item or of a vulnerable configuration item. Other terminology is possible as well.

When security vulnerabilities are discovered on an enterprise's managed network, the enterprise may seek to carry out remediation of such security vulnerabilities with the help of remediator(s). Herein, a remediator may refer to one or more entities that resolve security vulnerabilities found on an enterprise's managed network. In some cases, a remediator may be an individual working at the enterprise. In other cases, a remediator may be a particular IT support group at the enterprise, which may consist of one or more individuals. In yet other cases, a remediator could be a third-party vendor or individual that specializes in resolving one or more security vulnerabilities. In any case, a computational instance of a remote network management platform may have stored thereon a plurality of remediator identifiers each representative of a respective remediator, which could be an individual or a group of individuals, among others.

Further, a computational instance of a remote network management platform may be configured to group configuration items having security vulnerabilities, so as to assist with the process of remediating security vulnerabilities. In line with the discussion above, such grouping may be based on a key incorporating attributes, such as attributes of configuration items (e.g., a department and/or location of configuration items) and/or security vulnerability attributes (e.g., a type of security vulnerability discovered on configuration items), for example. As noted, such grouping may be advantageous for various reasons. For example, the grouping may allow a remediator at an enterprise to focus on simultaneously remediating a particular security vulnerability discovered for several configuration items of a given department. Other examples are also possible.

Although automatic grouping of vulnerable configuration items can be advantageous, as noted, factors used by an enterprise as basis for such grouping may be different from those that the enterprise uses as basis for determining appropriate remediator(s) to resolve security vulnerabilities. As a result, the enterprise may need to forgo its preferred assignment processes by respectively assigning the group(s) of vulnerable configuration items to remediator(s), and/or may need to devote time and/or other resources to manually facilitate assignments for configuration items within each respective group, among other challenges.

In accordance with the present disclosure, a computing system of a remote network management platform may carry out automatic grouping and assignment of vulnerable configuration items of an enterprise's managed network. Advantageously, the automatic assignment may be in line with the enterprise's preferred assignment processes and may save the enterprise time on determining appropriate remediator assignments in accordance with such processes. Moreover, the automatic grouping may enable a given remediator to efficiently remediate vulnerable configuration items that have common attribute(s) and that have been assigned thereto, thereby avoiding or reducing situations in which remediation of vulnerable configuration items is carried out in no particular order, which can be inefficient and time consuming. Other advantages are also possible.

Figure 6A:
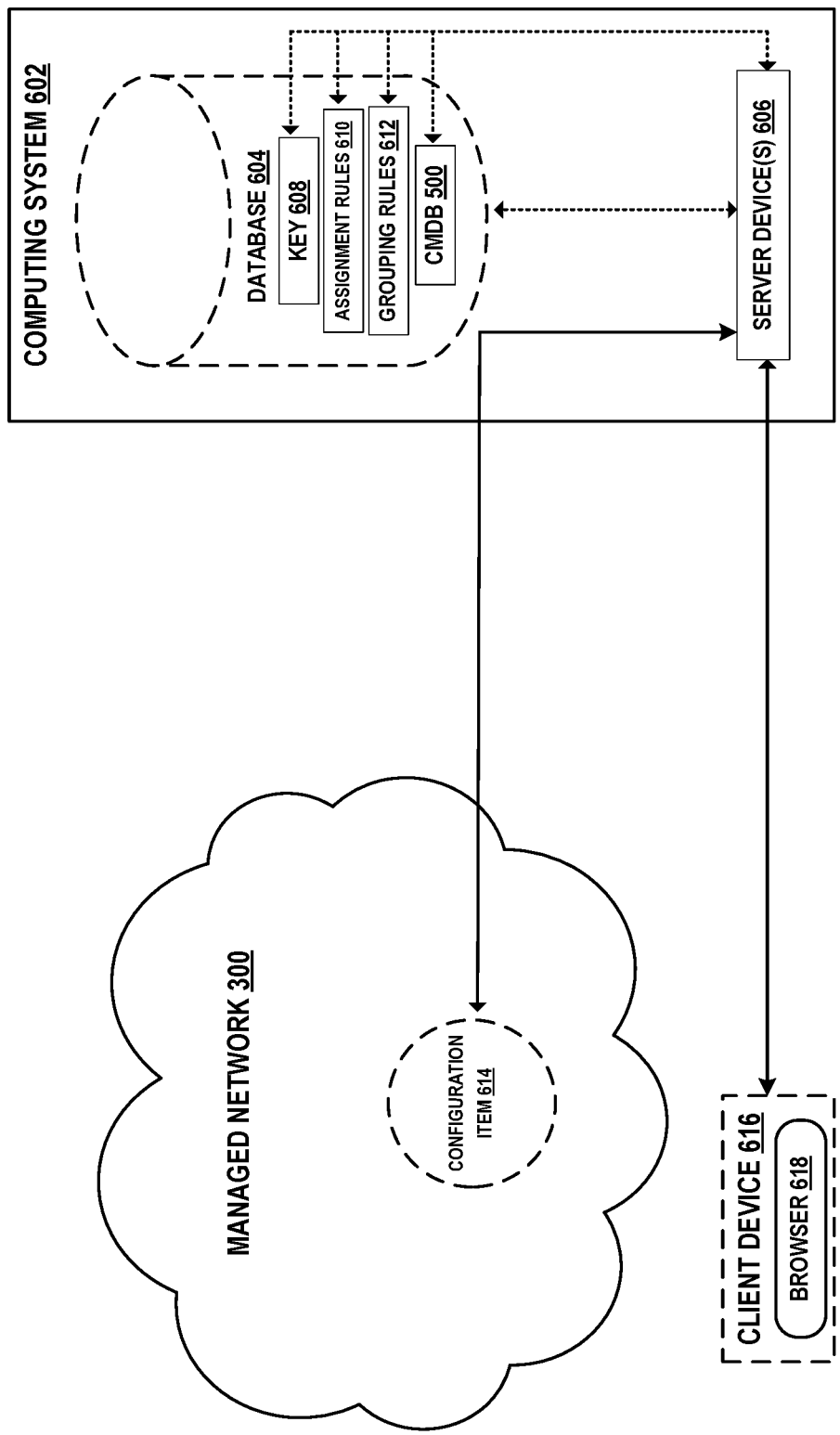
FIG. 6A depicts a computing system, a managed network, and a client device, in accordance with example embodiments.
Figure 6C:
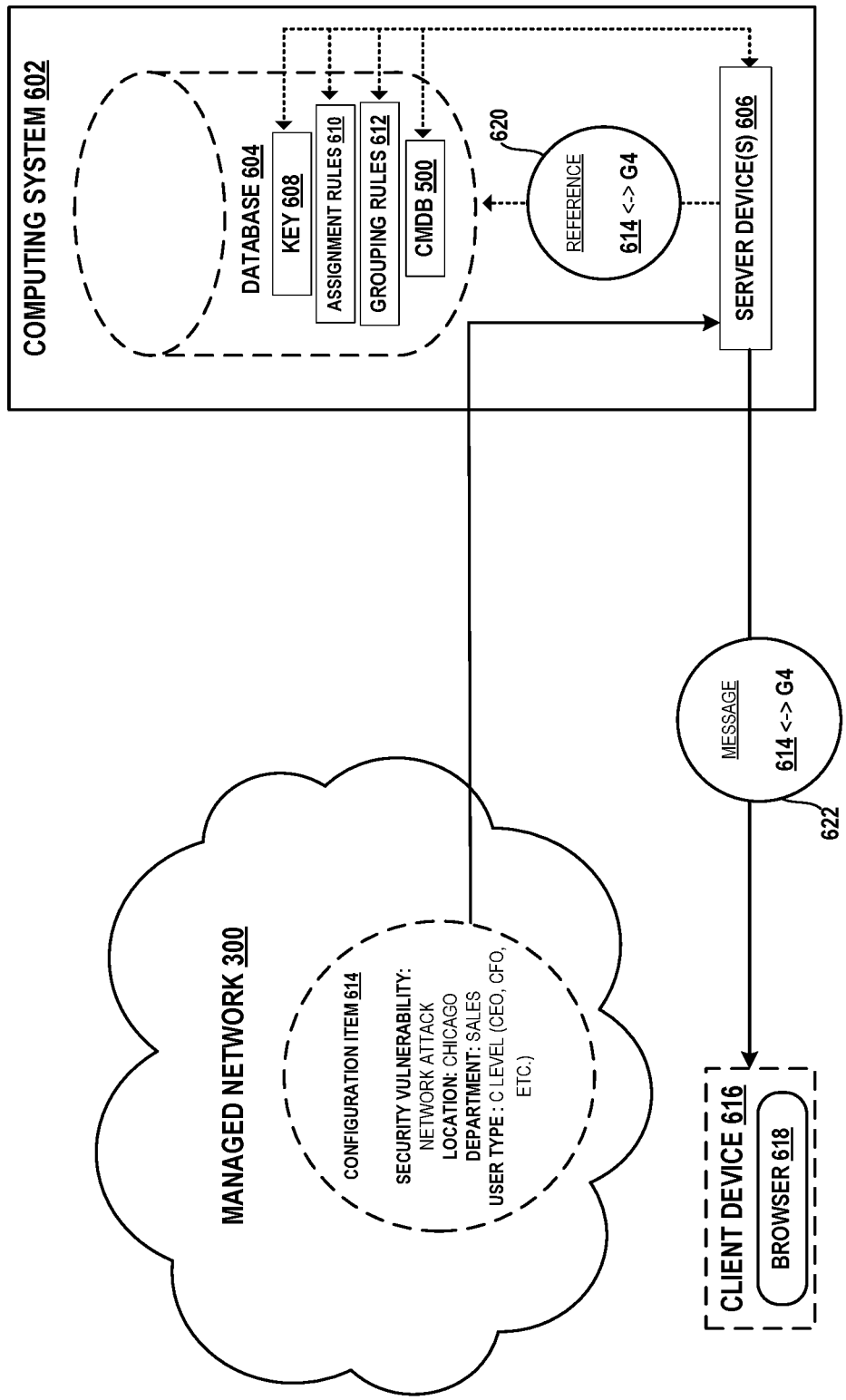
FIG. 6C depicts communications between the computing system, the managed network, and the client device, in accordance with example embodiments.

FIG. 6A to 6C illustrate features, components, and/or operations of a computing system 602, and also illustrate managed network 300 and client device 616. In practice, the computing system 602 may be part of a computational instance, such as computational instance 322 for example, among other options. Although FIGS. 6A to 6C illustrate a specific arrangement, various operations disclosed herein may be carried out in the context of similar and/or other arrangement(s) as well without departing from the scope of the present disclosure.

As an initial matter, client device 616 may be one of the client devices 302 on the managed network 300 or may be separate from the managed network 300. In some cases, the client device 616 could be of a remediator that resolves security vulnerabilities on the managed network 300, among other possibilities. In any case, the client device 616 may engage in communication with computing system 602, such as via wired and/or wireless communication link(s) (not shown). Moreover, as shown, the client device 616 may be configured to operate a web browser 618, which is an application that may retrieve, present, and/or navigate through information on the World Wide Web and/or on private websites.

The browser 618 may include a web-display tool (not shown) that provides for or otherwise supports display of information, such as information received from computing system 602. For example, as further discussed herein, the web-display tool may visually display, based on a message provided by the computing system 602, an indication that a particular vulnerable configuration item is in a particular group and has been assigned a particular remediator.

Furthermore, as shown, computing system 302 may include a database 604 and server device(s) 606. The server device(s) 606 may engage in communications with managed network 300, client device 616, and/or other entities. Also, the server device(s) 606 may use information contained in database 604 to facilitate automatic grouping and assignment of vulnerable configuration items in accordance with the present disclosure. The database 604 could be a CMDB of a computational instance, such as CMDB 500 for example. Additionally or alternatively, database 604 may be a database that is different from a CMDB found within the remote network management platform, yet including at least some of the information stored in a CMDB. Moreover, the database 604 may contain a key 608, assignment rules 610, and grouping rules 612, at least some of which may be set in accordance with preferences of the managed network 300's enterprise (e.g., set via a GUI of a client device in communication with the computing system 602).

More specifically, CMDB 500 of database 604 may contain attributes of managed network 300's discovered configuration items. These attributes may include item attributes of configuration devices, such as information about respective locations, departments, operating systems, owners, users, hardware characteristics, and/or software characteristics of discovered configuration items. Additionally, these attributes may include vulnerability attributes, which indicate security vulnerabilities respectively discovered for certain configuration items and/or which provide information about each such security vulnerability (e.g., security vulnerability type and/or a security vulnerability category).

In accordance with the present disclosure, one or more of the above-described attributes may be incorporated by key 608 for purpose of defining groups of vulnerable configuration items. Generally, the key 608 may be set in accordance with preferences of the managed network 300's enterprise. As such, the computing system 602 may be configured to receive, from device(s) of the managed network 300, an indication of attribute(s) incorporate by the key 608. In practice, such an indication could be provided via a GUI on a device of the managed network 300, among other options. In other cases, however, the computing system 602 may obtain an indication of attribute(s) incorporated by the key 608 in other ways, such as through manual input for example. Nonetheless, attribute(s) incorporated by the key 608 may effectively establish at least some of the factors that the computing system 602 may use as basis for automatically grouping vulnerable configuration items.

By way of example (and without limitation), FIG. 6B illustrates that attribute(s) incorporated by the key 608 may include a security vulnerability type, a location, and a department. In this example, the key 608 may indicate to the computing system 602 that vulnerable configuration items having at least the same security vulnerability type, location, and department should be grouped together. Thus, application of this key 608 may result in (i) vulnerable configuration items that encountered or are susceptible to a phishing attack and that are of a marketing department in San Diego being grouped together, (ii) vulnerable configuration items that encountered or are susceptible to a phishing attack and that are of a marketing department in New York being grouped together, and (iii) vulnerable configuration items that encountered or are susceptible to a network attack and that are of a sales department in Chicago being grouped together. Other examples are also possible.

Further, assignment rules 610 may also be set in accordance with preferences of the managed network 300's enterprise. As such, the computing system 602 may be configured to receive one or more of the assignment rules 610 from device(s) of the managed network 300, such as via a GUI on a device of the managed network 300, among other options. In other cases, however, the computing system 602 may obtain one or more of the assignment rules 610 in other ways, such as through manual engineering input for example.

In any case, the assignment rules 610 may set condition(s) for assigning vulnerable configuration items to remediators. More specifically, each remediator may be represented by a remediator identifier in the database 604. Further, a condition may be an expression referring to one or more attributes. These attributes may include item attributes and/or vulnerability attributes. For example, a given expression may refer to (i) a particular security vulnerability, (ii) a particular type of user, (iii) a particular type of operating system, (iv) particular hardware characteristics, (v) particular software characteristics, and/or (vi) a particular type of network, among others.

As such, the assignment rules may respectively relate (i) configuration items with attributes matching conditions to (ii) remediator identifiers. In this way, the computing system 602 may apply the assignment rules 610 to determine a particular remediator identifier for a particular configuration item, and that particular remediator identifier may be another factor for grouping of vulnerable configuration items.

Moreover, each assignment rule of the assignment rules 610 may have a respective priority. As with the condition(s) and related remediator identifier(s) of the assignment rules 610, these priorities may also be set in accordance with preferences of the managed network 300's enterprise. Nonetheless, the assignment rules 610 may be in an order according to the priorities, such that a certain assignment rule is of the highest priority, another assignment rule is of a second highest priority, and so on.

Given this, when the computing system 602 compares attributes of a particular configuration item to the assignment rules 610, the computing system 602 may do so in the order of the priorities, such as by first comparing the particular configuration item to the highest priority assignment rule and then comparing the particular configuration item to the second highest priority assignment rule, and so on. This approach may help prevent a situation in which the computing system 602 determines that attributes of the particular configuration item match conditions of multiple assignment rules, and thus in which the computing system 602 is unable to determine which of these assignment rules to apply so as to determine a remediator identifier for the particular configuration item.

By way of example (and without limitation), FIG. 6B illustrates an example set of assignment rules 610. As shown, this set includes a first assignment rule that is of a highest priority (i.e., priority level 1), a second assignment rule that is of a second highest priority (i.e., priority level 2), a third assignment rule that is of a third highest priority (i.e., priority level 3), and a fourth assignment rule that is of the lowest priority (i.e., priority level 4).

As an initial matter, the first assignment rule relates (i) a condition that expresses a security vulnerability type of "phishing attack" to (ii) a remediator identifier of "email management group". Given this, if the computing system 602 determines that a particular configuration item has a security vulnerability of the "phishing attack" type, then the computing system may determine that attribute(s) of the particular configuration item match the condition of the first assignment rule, and may responsively assign particular configuration item for remediation by "email management group" in accordance with the first assignment rule. However, if the computing system 602 determines attribute(s) of the particular configuration item do not match the condition of the first assignment rule, then the computing system 602 may next compare the particular configuration item to the second assignment rule.

As shown, the second assignment rule relates (i) a condition that expresses a user type of "C Level" (e.g., a user is a CEO, CFO, or other high-level position within the enterprise) to (ii) a remediator identifier of "C Level IT group". Given this, if the computing system 602 determines that a user of the particular configuration item is of a "C Level", then the computing system may determine that attribute(s) of the particular configuration item match the condition of the second assignment rule, and may responsively assign particular configuration item for remediation by "C Level IT group" in accordance with the second assignment rule. However, if the computing system 602 determines attribute(s) of the particular configuration item do not match the condition of the second assignment rule, then the computing system 602 may next compare the particular configuration item to the third assignment rule.

As shown, the third assignment rule relates (i) a condition that expresses a hardware characteristic of "configuration item is a database with personally identifiable information (PII) data" (e.g., data that would enable identification of an individual rather than anonymously representing information about that individual) to (ii) a remediator identifier of "PII database group". Given this, if the computing system 602 determines that the particular configuration item is indeed a database with PII data, then the computing system may determine that attribute(s) of the particular configuration item match the condition of the third assignment rule, and may responsively assign particular configuration item for remediation by "PII database group" in accordance with the third assignment rule. However, if the computing system 602 determines attribute(s) of the particular configuration item do not match the condition of the third assignment rule, then the computing system 602 may next compare the particular configuration item to the fourth assignment rule.

As shown, the fourth assignment rule relates (i) a condition that expresses an operating system type of "WINDOWS® operating system", a security vulnerability type of "network attack", and a network type of "local" to (ii) a remediator identifier of "Windows networking group". Given this, if the computing system 602 determines that the particular configuration item has a WINDOWS® operating system, a security vulnerability of the "network attack" type, and is connected to a local network, then the computing system may determine that attribute(s) of the particular configuration item match the condition of the fourth assignment rule, and may responsively assign particular configuration item for remediation by "Windows networking group" in accordance with the fourth assignment rule.

However, if the computing system 602 determines attribute(s) of the particular configuration item do not match the condition of the lowest priority (i.e., fourth) assignment rule, then the computing system 602 may carry out other operations. In some cases, the database 604 may contain a remediator identifier that represents a "fallback" remediator, which is a remediator that is be assigned any configuration item(s) for which no condition has been matched according to the assignment rules 610. Generally, the "fallback" remediator could be set based on an enterprise's preference, such via a GUI on a client device for example. As such, if the computing system 602 determines that attribute(s) of a particular configuration item do not match the condition of the lowest priority assignment rule, the computing system 602 may responsively assign the particular configuration item to the "fallback" remediator. In other cases, if the computing system 602 determines that attribute(s) of a particular configuration item do not match the condition of the lowest priority assignment rule, the computing system 602 may generate a report that may be accessible to device(s) of the managed network 300. This report may indicate that none of the assignment rules 610 applied with respect to the particular configuration item and/or may include information about item and/or vulnerability attributes of the particular configuration item, among other options. Other cases are also possible.

In some implementations, one or more of the assignment rules 610 may refer to a pre-designated remediator with respect to certain configuration item(s). In particular, an individual at an enterprise or other entity may establish in advance that a certain remediator, which could be referred to herein as a pre-designated remediator, should be assigned to resolve security vulnerabilities for certain configuration item(s). In practice, such pre-designation of a remediator for certain configuration item(s) may be set according to an enterprise's preferences, such as via a GUI of a client device.

As such, at least one of the assignment rules 610 may include a condition referring to a particular remediator identifier as being pre-designated for one or more configuration items of the managed network 300. For example, an assignment rule may indicate that, if a given configuration item being evaluated is determined to be a particular computing device of the managed network 300 (e.g., identified by a device identifier), then that given configuration item is to be assigned to a "General IT group", which has been pre-designated for handling any security vulnerabilities that may be encountered by the particular computing device. Moreover, such an assignment rule that refers to a pre-designated remediator could be automatically and/or manually set to be of a higher or even highest priority, so as to ensure that this assignment rule's condition is matched if a given configuration item is indeed one of the configuration items related to the pre-designated remediator according to this assignment rule. Other implementations are also possible.

Yet further, as noted, the database 604 may contain grouping rules 612 for grouping of vulnerable configuration items based on the key 608 and the assigned remediator determined through application of the assignment rules 610. In particular, each grouping rule may respectively involve grouping vulnerable configuration items that have common values with respect to attributes incorporated by the key 608 and relate to a common remediator identifier in accordance with the assignment rules 610. For example, if attributes incorporated by the key 608 include a security vulnerability type, a location, and a department, then vulnerable configuration items that are determined to have the same security vulnerability type, location, department, and assigned remediator identifier will be grouped together in accordance with the grouping rules 612. In this way, each group may respectively include vulnerable configuration items that have common attributes while reflecting the assigned remediator for these vulnerable configuration items, thereby helping an enterprise avoid a time-consuming manual assignment process while helping remediator(s) more efficiently resolve security vulnerabilities.

In this regard, application of the grouping rules 612 may result in adding some vulnerable configuration items respectively to existing group(s) and/or may result in both dynamically creating groups and adding some vulnerable configuration items respectively to such dynamically-created group(s).

In one situation, a given grouping rule may establish a grouping of vulnerable configuration items that have particular value(s) for attribute(s) incorporated by the key 608 and that have been assigned a particular remediator identifier, and the database 604 may already contain a group identifier representing a particular group arranged to contain vulnerable configuration items that meet such criteria. In practice, the database 604 may contain a mapping that maps this group identifier to the particular value(s) and the particular remediator identifier, so as to establish this arrangement of the particular group.

As such, when determining a particular group for a particular configuration item that has the particular value(s) for attribute(s) incorporated by the key 608 and has been assigned the particular remediator identifier, the computing system 602 may identify that the particular group exists using the key 608 and the particular remediator identifier, such as based on the above-mentioned mapping. Accordingly, once the computing system 602 identifies that the particular group exists, the computing system 602 may add the particular configuration item to the particular group, such as by storing, in the database 604, a reference to the particular configuration item in the particular group.

In another situation, however, a given grouping rule may establish grouping of vulnerable configuration items that have particular value(s) for attribute(s) incorporated by the key 608 and that have been assigned a particular remediator identifier, but the database 604 might not yet contain a group identifier representing a particular group arranged to contain vulnerable configuration items that meet such criteria. In this situation, the computing system 602 may dynamically create the particular group, so that the vulnerable configuration items meeting the criteria could be added to the particular group.

More specifically, when determining a particular group for a particular configuration item that has the particular value(s) for attribute(s) incorporated by the key 608 and has been assigned the particular remediator identifier, the computing system 602 may use the key 608 and the particular remediator identifier to determine that the particular group does not exist. For example, the computing system 602 may determine no group identifier in the database 604 is mapped to both the particular value(s) and the particular remediator identifier.

When the computing system 602 determines that the particular group does not exist, the computing system 602 may create an entry for the particular group to the set of grouping rules, which may specify the particular values for attributes incorporated by the key 608 as well as the particular remediator identifier. For example, the computing system 602 may generate a group identifier that represents the particular group as well as a mapping that maps this group identifier to the particular values and the particular remediator identifier. Accordingly, once the computing system 602 creates an entry for the particular group, the computing system 602 may add the particular configuration item to this dynamically-generated particular group, such as by storing, in the database 604, a reference to the particular configuration item in the particular group.

By way of example (and without limitation), FIG. 6B illustrates how grouping rules 612 may establish groupings of vulnerable configuration items based on the key 608 and the assigned remediator determined through application of the assignment rules 610.

In one case, grouping rules 612 indicate grouping of vulnerable configuration items that (i) encountered or are susceptible to a phishing attack, (ii) are of a marketing department in San Diego, and (iii) have been assigned to remediator "email management group" according to assignment rules 610. As shown, vulnerable configuration items meeting these criteria are to be added to a group "G1", which may exist or may be dynamically created.

In another case, grouping rules 612 indicate grouping of vulnerable configuration items that (i) encountered or are susceptible to a phishing attack, (ii) are of a marketing department in New York, and (iii) have been assigned to remediator "email management group" according to assignment rules 610. As shown, vulnerable configuration items meeting these criteria are to be added to a group "G2", which may exist or may be dynamically created.

In yet another case, grouping rules 612 indicate grouping of vulnerable configuration items that (i) encountered or are susceptible to a network attack, (ii) are of a marketing department in New York, and (iii) have been assigned to remediator "C Level IT group" according to assignment rules 610. As shown, vulnerable configuration items meeting these criteria are to be added to a group "G3", which may exist or may be dynamically created.

In yet another case, grouping rules 612 indicate grouping of vulnerable configuration items that (i) encountered or are susceptible to a network attack, (ii) are of a sales department in Chicago, and (iii) have been assigned to remediator "C Level IT group" according to assignment rules 610. As shown, vulnerable configuration items meeting these criteria are to be added to a group "G4", which may exist or may be dynamically created.

In yet another case, grouping rules 612 indicate grouping of vulnerable configuration items that (i) encountered or are susceptible to a network attack, (ii) are of a sales department in Chicago, and (iii) have been assigned to remediator "PII database group" according to assignment rules 610. As shown, vulnerable configuration items meeting these criteria are to be added to a group "G5", which may exist or may be dynamically created.

In yet another case, grouping rules 612 indicate grouping of vulnerable configuration items that (i) encountered or are susceptible to a network attack, (ii) are of a sales department in Chicago, and (iii) have been assigned to remediator "Windows networking group" according to assignment rules 610. As shown, vulnerable configuration items meeting these criteria are to be added to a group "G6", which may exist or may be dynamically created. Other cases are also possible.

Given the above-described information in the database 604, the computing system 602, or more specifically server device(s) 606, may carry out certain operations that use this information to facilitate automatic grouping and assignment of vulnerable configuration items. As an initial matter, when evaluating a particular vulnerable configuration item, the computing system 602 may compare the particular configuration item to the assignment rules 610 until a matching condition is found. Such comparison may be carried out in the order of the priorities of the assignment rules 610 and may involve consideration of item and/or vulnerability attributes of the particular configuration item as discussed. Once a matching condition is found, the computing system may determine a particular remediator identifier that is related to the matching condition according to the assignment rule defining this condition. Then, based on the key 608 and the particular remediator identifier, the computing system 602 may determine a particular group for the particular configuration item according to the grouping rules 612, and may store, in the database 604, a reference to the particular configuration item in the particular group.

In some implementations, the computing system 602 may use the reference as basis for sending, to a client device, a message indicating that the particular configuration item is in the particular group. The message could be a graphical indication that can be displayed on a GUI of the client device, or may serve as basis for the client device generating such a graphical indication. In either scenario, the graphical indication may visually indicate information related to the particular configuration item being in the particular group. For example, the graphical indication may visually indicate a group identifier of the particular group, some or all configuration items in the particular group, the assigned remediator associated with the particular group, and/or attributes of configuration items in the particular group, among other options. Furthermore, in some situations, the message may be sent automatically, such as in response to determining the particular group and/or in response to storing the reference. But in other situations, the message may be sent in response to a request from the client device. In any case, the client device could be any feasible client device, such as a client device of the managed network 300 or another client device authorized to receive the message.

To that end, it may be advantageous to send the message to the assigned remediator, so that this remediator is aware of the vulnerable configuration items assigned thereto and/or of any common attributes such vulnerable configuration items may have. Thus, the computing system 602 may be configured to determine which particular client device is associated with the particular remediator identifier representative of the assigned remediator, and may responsively send the message to this particular client device. In practice, the computing system 602 could determine in various ways which particular client device is associated with the particular remediator identifier, such as by referring to mapping data in the database 604 (not shown) that associates client device(s) respectively with remediator(s).

By way of example (and without limitation), FIG. 6C illustrates operations that the server device(s) 606 may carry out to facilitate automatic grouping and assignment. As shown, server device(s) 606 may discover that a configuration item 614 is susceptible to a network attack, is of a sales department in Chicago, and is used by a C Level user. Given this information, the server device(s) 606 may then facilitate automatic grouping and assignment for the configuration item 614.

In particular, the server device(s) 606 may compare the configuration item 614 to the assignment rules 610 in the order of their priorities. Through this process, the server device(s) 606 may determine that values of the attributes of configuration item 614 match the condition of the above-described second assignment rule, which expresses a user type of "C Level". Given this, the server device(s) 606 may determine that configuration item 614 is to be assigned to "C Level IT group", because the remediator identifier of "C Level IT group" is related to the matching condition according to the second assignment rule. Then, according to grouping rules 612, the server device(s) 606 may determine that configuration item 614 is to be added to group "G4" based on the configuration item 614 (i) being assigned to the "C Level IT group" according to assignment rules 610 and (ii) being susceptible to a network attack and of a sales department in Chicago according to key 608. Accordingly, server device(s) 606 may store a reference 620 to the configuration item 614 in group "G4" and/or may send, to client device 616, a message 622 indicating that the configuration item 614 is in group "64", with this message 622 possibly being displayed on browser 618 of the client device 616, among other options.

Advantageously, the reference 620 and/or message 622 may effectively indicate that the "C Level IT group" should resolve the security vulnerability of the configuration item 614, which amounts to a time-saving and automatic assignment of a remediator in accordance with preferences of the managed network 300's enterprise. Moreover, the assigned "C Level IT group" may use this reference 620 and/or message 622 to determine that the configuration item 614 is grouped with other configuration items that have also been assigned to the "C Level IT group" and that have the same attributes (e.g., susceptibility to network attack(s) and being of a sales department in Chicago) as the configuration item 614. As a result, the "C Level IT group" could efficiently remediate configuration items by simultaneously resolving susceptibility to network attack(s) for all configuration items of the sales department in Chicago that have been determined to be susceptible to network attack(s). Other illustrations are also possible.

VII. Example Operations

Figure 7:
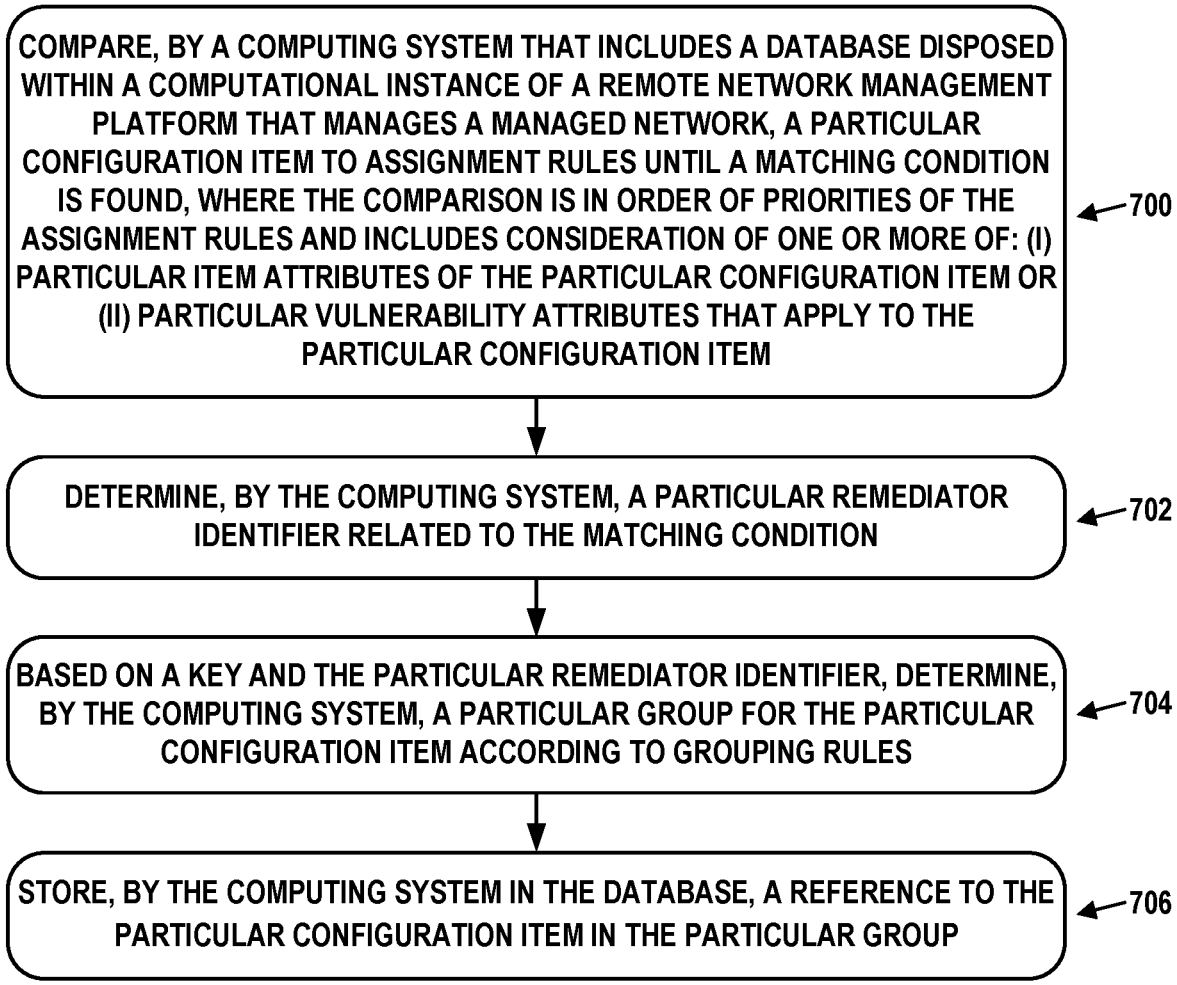
FIG. 7 is another flow chart, in accordance with example embodiments.

FIG. 7 is a flow chart illustrating an example embodiment. The process illustrated by FIG. 7 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 7 may be simplified by the removal of any one or more of the features shown therein. Further, these embodiments may be combined with features, aspects, and/or implementations of any of the previous figures or otherwise described herein.

Block 700 may involve comparing, by a computing system that includes a database disposed within a computational instance of a remote network management platform that manages a managed network, a particular configuration item to assignment rules until a matching condition is found, where the database contains attributes including: item attributes of a plurality of configuration items associated with the managed network, and vulnerability attributes of a plurality of security vulnerabilities related to the item attributes, where the database also contains the assignment rules, where the assignment rules are defined by respective priorities and conditions, where the priorities indicate an ordering of the assignment rules, where each condition is an expression referring to at least one attribute, where the assignment rules respectively relate, according to the priorities, (i) configuration items with attributes matching the conditions to (ii) remediator identifiers, wherein the database also contains a key for defining groups of vulnerable configuration items according to a set of grouping rules, where the key incorporates one or more of the attributes, and where the comparison is in order of the priorities and includes consideration of one or more of: (i) particular item attributes of the particular configuration item or (ii) particular vulnerability attributes that apply to the particular configuration item.

Block 702 may involve determining, by the computing system, a particular remediator identifier related to the matching condition.

Block 704 may involve, based on the key and the particular remediator identifier, determining, by the computing system, a particular group for the particular configuration item according to the grouping rules.

Block 706 may involve storing, by the computing system in the database, a reference to the particular configuration item in the particular group.

In some embodiments, a particular security vulnerability may enable an unauthorized action to be performed within the managed network.

In some embodiments, the plurality of security vulnerabilities may include one or more security vulnerabilities of one or more software applications that are configured to execute on computing devices of the managed network.

In some embodiments, the particular remediator identifier may be representative of one or more entities that resolve security vulnerabilities found on the managed network.

In some embodiments, referring to at least one attribute may involve referring to one or more of (i) a particular security vulnerability, (ii) a particular type of user, (iii) a particular type of operating system, (iv) particular hardware characteristics, (v) particular software characteristics, or (vi) a particular type of network.

In some embodiments, the matching condition may be a particular expression referring to the particular remediator identifier as being pre-designated for the particular configuration item.

In some embodiments, each grouping rule of the set may respectively relate to grouping vulnerable configuration items that (i) have common values with respect to attributes incorporated by the key and (ii) relate to a common remediator identifier in accordance with the assignment rules.

In some embodiments, the attributes incorporated by the key may include one or more of (i) one or more of the vulnerability attributes, (ii) a location, or (iii) a department.

In some embodiments, the computing system may receive, from a third-party server or from a client device of the managed network, an indication of one or more of the plurality of security vulnerabilities.

In some embodiments, determining the particular group for the particular configuration item may involve: using the key and the particular remediator identifier to identify that the particular group exists according to the set of grouping rules.

In some embodiments, determining the particular group for the particular configuration item may involve: using the key and the particular remediator identifier to determine that the particular group does not exist according to the set of grouping rules; and adding an entry for the particular group to the set of grouping rules, wherein the entry specifies: (i) values, from the particular configuration item, of the one or more of the attributes incorporated by the key, and (ii) the particular remediator identifier.

In some embodiments, based on the stored reference, the computing system may provide, to a particular client device that is associated with the particular remediator identifier, a message indicating at least that the particular configuration item is in the particular group.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
   a database disposed within a computational instance of a remote network management platform that manages a managed network, wherein the database contains attributes including: item attributes of a plurality of configuration items associated with the managed network, and vulnerability attributes of a plurality of security vulnerabilities related to the item attributes,
   wherein the database also contains assignment rules defined by respective priorities and conditions, wherein the priorities indicate an ordering of the assignment rules, wherein each condition is an expression referring to at least one attribute, wherein the assignment rules respectively relate, according to the priorities, (i) configuration items with attributes matching the conditions to (ii) remediator identifiers,
   wherein the database also contains a key for defining groups of vulnerable configuration items according to a set of grouping rules, and wherein the key incorporates one or more of the attributes; and
   one or more server devices, disposed within the computational instance, configured to:
      compare, in order of the priorities, a particular configuration item to the assignment rules until a matching condition is found, wherein the comparison includes consideration of one or more of: (i) particular item attributes of the particular configuration item or (ii) particular vulnerability attributes that apply to the particular configuration item;
      determine a particular remediator identifier related to the matching condition;
      based on the key and the particular remediator identifier, determine a particular group for the particular configuration item according to the grouping rules; and
      store, in the database, a reference to the particular configuration item in the particular group.

2. The computing system of claim 1, wherein a particular security vulnerability enables an unauthorized action to be performed within the managed network.

3. The computing system of claim 1, wherein the plurality of security vulnerabilities comprise one or more security vulnerabilities of one or more software applications that are configured to execute on computing devices of the managed network.

4. The computing system of claim 1, wherein the particular remediator identifier is representative of one or more entities that resolve security vulnerabilities found on the managed network.

5. The computing system of claim 1, wherein referring to at least one attribute comprises referring to one or more of (i) a particular security vulnerability, (ii) a particular type of user, (iii) a particular type of operating system, (iv) particular hardware characteristics, (v) particular software characteristics, or (vi) a particular type of network.

6. The computing system of claim 1, wherein the matching condition is a particular expression referring to the particular remediator identifier as being pre-designated for the particular configuration item.

7. The computing system of claim 1, wherein each grouping rule of the set respectively relates to grouping vulnerable configuration items that (i) have common values with respect to attributes incorporated by the key and (ii) relate to a common remediator identifier in accordance with the assignment rules.

8. The computing system of claim 1, wherein the attributes incorporated by the key comprises one or more of (i) one or more of the vulnerability attributes, (ii) a location, or (iii) a department.

9. The computing system of claim 1, wherein the one or more server devices are further configured to:
receive, from a third-party server or from a client device of the managed network, an indication of one or more of the plurality of security vulnerabilities.

10. The computing system of claim 1, wherein determining the particular group for the particular configuration item comprises:
using the key and the particular remediator identifier to identify that the particular group exists according to the set of grouping rules.

11. The computing system of claim 1, wherein determining the particular group for the particular configuration item comprises:
using the key and the particular remediator identifier to determine that the particular group does not exist according to the set of grouping rules; and
adding an entry for the particular group to the set of grouping rules, wherein the entry specifies: (i) values, from the particular configuration item, of the one or more of the attributes incorporated by the key, and (ii) the particular remediator identifier.

12. The computing system of claim 1, wherein the one or more server devices are further configured to:
based on the stored reference, provide, to a particular client device that is associated with the particular remediator identifier, a message indicating at least that the particular configuration item is in the particular group.

13. A method comprising:
comparing, by a computing system that includes a database disposed within a computational instance of a remote network management platform that manages a managed network, a particular configuration item to assignment rules until a matching condition is found, wherein the database contains attributes including: item attributes of a plurality of configuration items associated with the managed network, and vulnerability attributes of a plurality of security vulnerabilities related to the item attributes, wherein the database also contains the assignment rules, wherein the assignment rules are defined by respective priorities and conditions, wherein the priorities indicate an ordering of the assignment rules, wherein each condition is an expression referring to at least one attribute, wherein the assignment rules respectively relate, according to the priorities, (i) configuration items with attributes matching the conditions to (ii) remediator identifiers, wherein the database also contains a key for defining groups of vulnerable configuration items according to a set of grouping rules, wherein the key incorporates one or more of the attributes, and wherein the comparison is in order of the priorities and includes consideration of one or more of:
(i) particular item attributes of the particular configuration item or (ii) particular vulnerability attributes that apply to the particular configuration item;
determining, by the computing system, a particular remediator identifier related to the matching condition;
based on the key and the particular remediator identifier, determining, by the computing system, a particular group for the particular configuration item according to the grouping rules; and
storing, by the computing system in the database, a reference to the particular configuration item in the particular group.

14. The method of claim 13, wherein a particular security vulnerability enables an unauthorized action to be performed within the managed network.

15. The method of claim 13, wherein the particular remediator identifier is representative of one or more entities that resolve security vulnerabilities found on the managed network.

16. The method of claim 13, wherein each grouping rule of the set respectively relates to grouping vulnerable configuration items that (i) have common values with respect to attributes incorporated by the key and (ii) relate to a common remediator identifier in accordance with the assignment rules.

17. The method of claim 13, wherein determining the particular group for the particular configuration item comprises:
using the key and the particular remediator identifier to identify that the particular group exists according to the set of grouping rules.

18. The method of claim 13, wherein determining the particular group for the particular configuration item comprises:
using the key and the particular remediator identifier to determine that the particular group does not exist according to the set of grouping rules; and
adding an entry for the particular group to the set of grouping rules, wherein the entry specifies: (i) values, from the particular configuration item, of the one or more of the attributes incorporated by the key, and (ii) the particular remediator identifier.

19. An article of manufacture including a non-transitory computer-readable medium, having stored thereon program instructions that, upon execution by a computing system that includes a database disposed within a computational instance of a remote network management platform that manages a managed network, cause the computing system to perform operations comprising:
comparing a particular configuration item to assignment rules until a matching condition is found, wherein the database contains attributes including: item attributes of a plurality of configuration items associated with the managed network, and vulnerability attributes of a plurality of security vulnerabilities related to the item attributes, wherein the database also contains the assignment rules, wherein the assignment rules are defined by respective priorities and conditions, wherein the priorities indicate an ordering of the assignment rules, wherein each condition is an expression referring to at least one attribute, wherein the assignment rules respectively relate, according to the priorities, (i) configuration items with attributes matching the conditions to (ii) remediator identifiers, wherein the database also contains a key for defining groups of vulnerable configuration items according to a set of grouping rules, wherein the key incorporates one or more of the attributes, and wherein the comparison is in order of the priorities and includes consideration of one or more of: (i) particular item attributes of the particular configuration item or (ii) particular vulnerability attributes that apply to the particular configuration item;

determining a particular remediator identifier related to the matching condition;

based on the key and the particular remediator identifier, determining particular group for the particular configuration item according to the grouping rules; and storing, in the database, a reference to the particular configuration item in the particular group.

20. The article of manufacture of claim 19, wherein each grouping rule of the set respectively relates to grouping vulnerable configuration items that (i) have common values with respect to attributes incorporated by the key and (ii) relate to a common remediator identifier in accordance with the assignment rules.

\* \* \* \* \*